March 1, 1960  LE ROY J. LEISHMAN  2,927,211
TRACK FOLLOWERS FOR X-RAY SPOT FILM DEVICES
Filed July 7, 1958  2 Sheets-Sheet 1

INVENTOR.
Le Roy J. Leishman

March 1, 1960     LE ROY J. LEISHMAN     2,927,211
TRACK FOLLOWERS FOR X-RAY SPOT FILM DEVICES
Filed July 7, 1958     2 Sheets-Sheet 2

INVENTOR.
Le Roy J. Leishman

United States Patent Office 2,927,211
Patented Mar. 1, 1960

2,927,211

TRACK FOLLOWERS FOR X-RAY SPOT FILM DEVICES

Le Roy J. Leishman, Los Angeles, Calif.

Application July 7, 1958, Serial No. 746,756

1 Claim. (Cl. 250—66)

The invention herein described relates to a track-following means and more particularly to track-following means applicable to X-ray spot film devices. X-ray spot film devices are used by radiologists for making instantaneous radiographs of what is seen during a fluoroscopic examination. Such devices make it possible to make from one to four exposures on the same film. Apparatus of this kind is described in my Patent No. 2,817,766 and in Patent No. 2,811,648, issued to Simon Yerkovich and myself.

In the device of the latter patent, a carriage that holds and transports the film from a position outside of the X-ray beam must make successive excursions into and out of the X-ray beam and assume a different position each time it comes into the X-ray field so that a different portion of the film will be exposed during each successive excursion.

Figure 1:
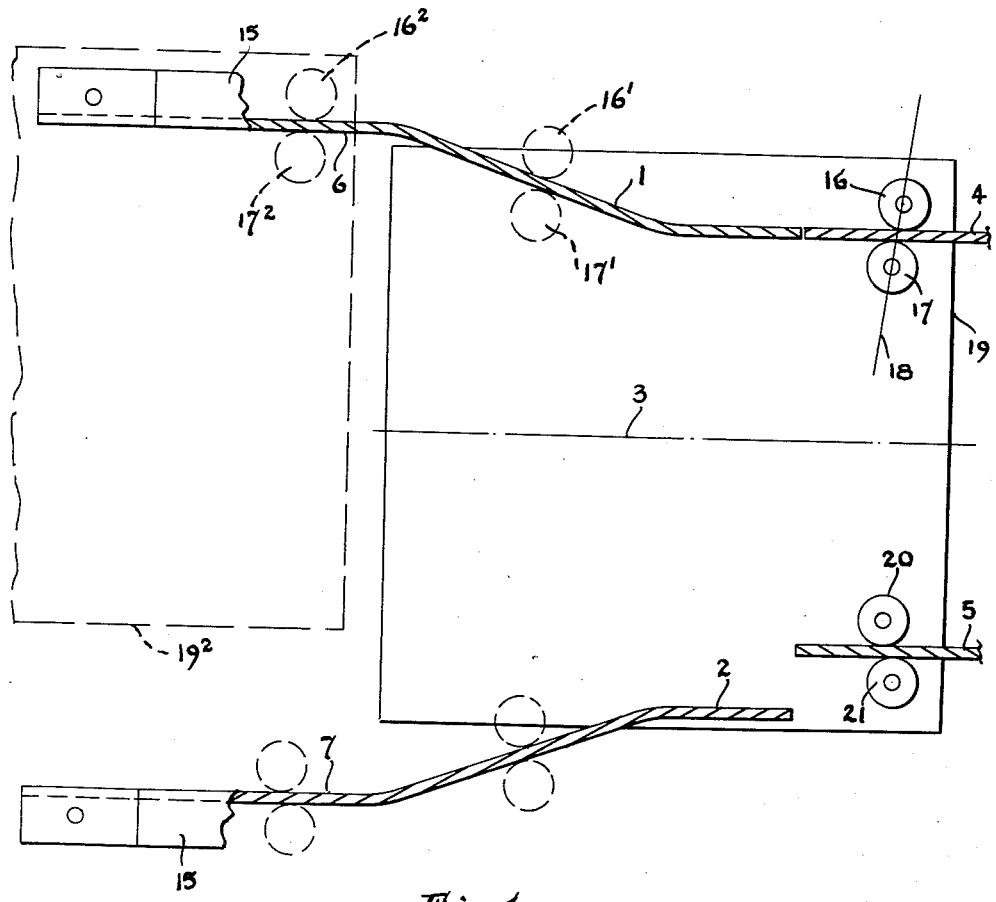

In the said device of said latter application, two home-position tracks are provided to cooperate respectively with two pair of ball bearings that straddle stationary tracks when the carriage is in its home or rest position. Two pivoted tracks are movable independently into alignment with the said home tracks, but only one of the pivoted tracks at a time is aligned with its associated home track. The pivoted tracks are curved as shown in Fig. 1 hereof where they are indicated by the numerals 1 and 2, respectively. These tracks are so disposed that each one is capable of moving the carriage over a path that diverges away from an imaginary line 3 that is parallel to the home tracks 4 and 5, the direction of divergence of each track being opposite from that of the other. In physical embodiments of the device shown in the said application, the straight portion 6 of track 1 is parallel to both of the home tracks 4 and 5 when track 1 is aligned with track 4, but in current embodiments it is displaced laterally from what would be a linear extension of the home track 4 by substantially 2¼". The straight portion 7 of track 2 is similarly displaced in an opposite direction with respect to its cooperating home track 5 when it is aligned therewith.

Figure 2:
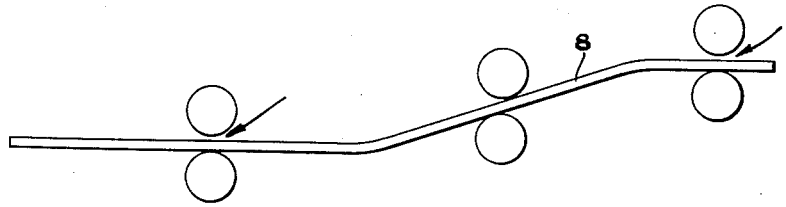
Figure 3:
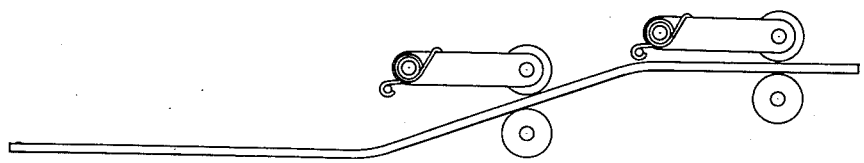

If the ball bearing track followers are disposed on a line that is at right angles to the straight portions of the tracks as indicated in Fig. 2, the spacing between the ball bearings must be considerably greater than the width of the track even if the said ball bearings are to be in firm engagement with the sides of the intermediate sloping portions 8, Fig. 2. The reason for this will be obvious from an examination of Fig. 5 where the ball bearings 9 and 10 are on a straight line 13 parallel to the side 11 of the carriage and therefore on a line that is at right angles to the home tracks, not shown. The ball bearings 9 and 10 are shown in engagement with opposite sides of the sloping or angled track 12. If these fixed ball bearings 9 and 10 were to traverse a portion of the track at right angles to their center line 13, it will be obvious from the drawing that there would be considerable space between the ball bearings and one or both sides of the track. The ball bearings 9 and 14 are shown on a line that is perpendicular to the sides of the track, and it will be noticed how much closer these ball bearings are together. Because of the desirability of avoiding slop or play between the ball bearing track-followers and the portions of the track being traversed, the spot film device described in the aforementioned application was provided with a ball bearing on one side of the track that was spring-loaded toward the ball bearing on the other side of the track, as shown in Fig. 3, hereof. The ball bearings were thus kept in firm engagement with the track regardless of its curvature or direction with respect to a line drawn between the centers of the ball bearings.

It is an object of the present invention to eliminate the aforementioned play or slop between the track followers and the straight portions of the track regardless of their relative angles without the necessity of spring-loading them.

An associated object of this invention is to permit close engagement between the ball bearing followers and the sides of the straight portions of the track when the ball bearing followers are mounted at fixed inter-center distances, regardless of the angle between the said portions and the common center line of said followers.

Other objects will appear as the specification proceeds.

In the figures:

Fig. 1 shows the underside of a carriage with the attached ball bearing track followers shown in continuous lines in engagement with the home tracks of a spot film device, and it shows other positions of the ball bearings and carriage in broken lines. This figure is generally a section view taken through the tracks on a plane adjacent the track flanges.

Fig. 2 illustrates, at the positions indicated by the arrows, the amount of play that would occur between ball bearings mounted on a line perpendicular to certain straight portions of the tracks if the spacing between the ball bearings were to be such that positive engagement would occur between the said fixed bearings and other straight portions of the track extending at an angle to the first mentioned portions.

Fig. 3 illustrates a former method of mounting one of the ball bearings on a spring-loaded pivoted arm in order to keep both ball bearings in engagement with their associated tracks regardless of the angle of said tracks.

Figure 4:
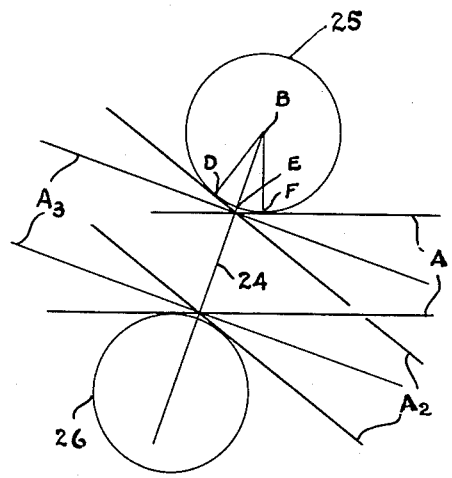

Fig. 4. This illustration shows the relationship of a pair of fixed ball bearings with respect to tracks A and $A^2$ disposed at opposite angles and with respect to a third track $A^3$ disposed at an angle that is midway between the angles of the other two tracks.

Figure 5:
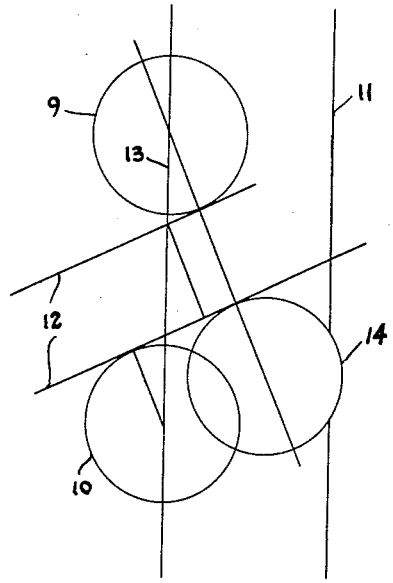

Fig. 5 is a diagram to show the amount of variation that must be provided between the centers of a pair of rotatable track followers if they are to engage a portion of a track that is at right angles to their center line as well as portions of the track that may be at other angles with respect to such center line.

The tracks that are normally employed in spot film devices embodying the instant invention use tracks having an L-shaped cross section. The side or arm of the tracks 1 and 2 forming what might be called the flange 15, is broken away in Fig. 1 throughout the greater portion of the length of the tracks in order to show the operation of the mechanism more clearly, and the flange is entirely cut away from the home tracks 4 and 5. This figure might therefore be considered to be a bottom view in longitudinal section of a portion of the spot film device taken on a plane cutting through the tracks just above the track flanges. In spot film devices embodying the invention herein described, the flanges of the home tracks 4 and 5 are used to mount the home tracks to the base of the apparatus.

The ball bearings 16 and 17 are shown mounted at a fixed distance on a center line 18 that is at an angle with respect to the home track 4; and the ball bearings 20 and 21 are shown mounted on fixed centers on a common center line that is disposed at an opposite angle with respect to the home track 5. The center lines of these two sets of ball bearings are thus also at opposite angles with respect to the sides of the carriage 19.

It will be noted when the ball bearings 16 and 17 have reached the position in which they are indicated at 16' and 17' that they also engage the opposite sides of the sloping or angularly disposed portions of the pivoted track 1, and that their angle with respect to these angularly disposed portions is the same as their angle with respect to the home tracks, but in an opposite direction. When the ball bearing track followers have guided the carriage into the position in which the carriage is indicated by the numeral $19^2$, it will be seen that the ball bearings (here designated as $16^2$ and $17^2$) are still at the same angle with respect to the straight portion 6 of the track that their common center line bore with respect to the sloping portion of the track, but the angle has been reversed again because the track is now disposed at the same angle as the home track 4.

In devices in which the invention herein described has been embodied, means are of course employed to keep the carriage 19 always oriented in the same direction. These means include another carriage on which carriage 19 is movably mounted so that it may move in the directions indicated by the arrow 22. The second carriage on which carriage 19 is thus mounted is constrained to move transversely only in the directions indicated by the arrow 23. Such means of course do not form a part of the instant invention and are therefore neither shown nor described in this application.

It will be seen that the same reversals of angle take place as the ball bearings 20 and 21 move away from the home track 5 and onto the sloping straight portion of pivoted track 2, when track 2 is aligned with home track 5.

If the straight intermediate portion of track 1 is at an angle of 18° with respect to the home track, the center line of the ball bearings 16 and 17 should be disposed at an angle of 9° with respect to a line that is perpendicular to the home track. This center line will thus be at an angle of 9° with respect to a line that is perpendicular to the straight sloping portion of track 1, but the angle will be disposed in the opposite direction. In laying out the angle of the center line for the ball bearings, it is thus merely necessary to determine the angle of the straight portions of deviation of adjacent the tracks and divide by 2. This will be clear from Fig. 4. The center line 24 of the rollers or ball bearings 25 and 26 in Fig. 4 is thus at an angle CBE with respect to track A and at an angle DBE with respect to track $A^2$. Thees angles are obviously the same and are one-half of angle CBD. CBD is the same as angle F.

The term "angle of deviation" used herein is the angle at which a straight portion of the track deviates from an adjacent straight portion of the track. The said "angle of deviation" is thus the difference between 180° and the angle formed by adjacent straight portions of the track that are mutually angularly disposed.

Track $A^3$ is at right angles to the center line 24 of the rollers or ball bearings 25 and 26. It will be noted that at point E on ball bearing 25, there is considerable space between the periphery of ball bearing 25 and the adjacent edge of track $A^3$ and that there is a similar space on the opposite side of track $A^3$ between it and the nearest point on the periphery of roller or ball bearing 26. This is the condition that prevails as the ball bearings 16 and 17 or 20 and 21 of Fig. 1 go around the curves of the tracks 1 and 2. In the operation of a spot film device, however, a little play in this position is of no moment, but it is important that the play be at a minimum between the ball bearings and the home tracks and the various straight portions of the tracks 1 and 2.

My claim is:

In an X-ray spot film device having a cassette carriage that is to be moved selectively in various directions, a track comprising at least one part and having a plurality of substantially straight sections angularly disposed with respect to each other, and a pair of rollers mounted on said carriage and positioned to engage opposite sides of said track, said rollers pivoted on centers having a common center line whose angle with respect to any straight portion of said track is substantially half the angle of deviation between said straight portion and an adjacent straight portion.

References Cited in the file of this patent

UNITED STATES PATENTS

| | | |
|---|---|---|
| 2,552,858 | Mueller et al. | May 15, 1951 |
| 2,811,648 | Leishman et al. | Oct. 29, 1957 |